Patented Oct. 26, 1948

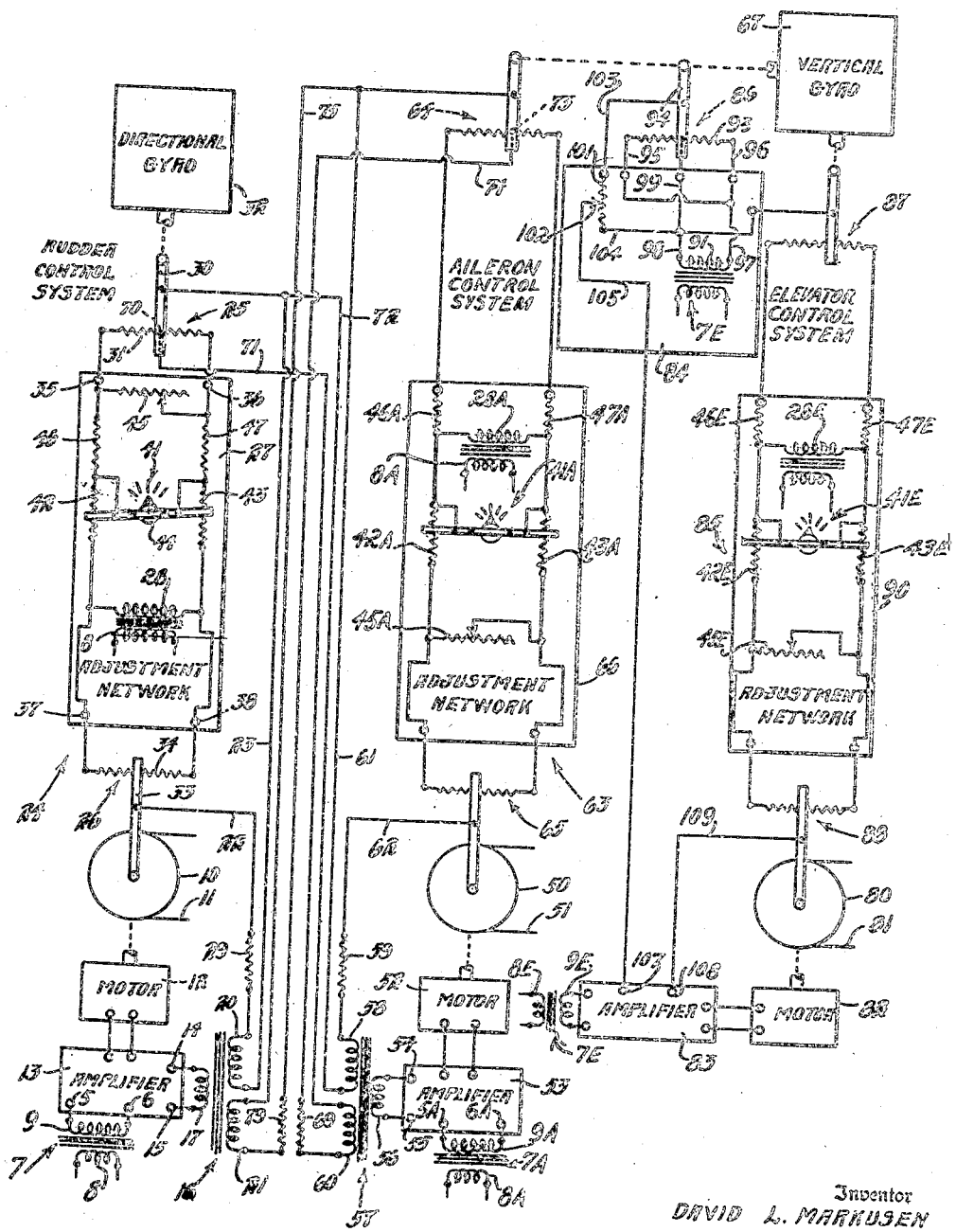

2,452,311

UNITED STATES PATENT OFFICE 2,452,311

ELECTRIC MOTOR CONTROL APPARATUS

David L. Markusen, Minneapolis, Minn., assignor to Minneapolis-Honeywell Regulator Company, Minneapolis, Minn., a corporation of Delaware Application February 8, 1943, Serial No. 475,113

5 Claims. (Cl. 318—29)

The present invention relates to control apparatus, and particularly to apparatus for automatically operating the flight control surfaces of an aircraft.

An object of the present invention is to provide an improved flight control system for aircraft of the type shown and described in the co-pending application of Willis H. Gille, Serial No. 447,989, filed June 22, 1942. The system shown in the Gille application includes a system for controlling each flight control surface which is responsive to the resultant of two controlling conditions. In the case of the rudder, one of the controlling conditions is the deflection of the aircraft from a predetermined course, as measured by a directional gyroscope, and the other controlling condition is the tilting of the aircraft about a longitudinal axis passing through it from nose to tail, as measured by a vertical gyroscope. In the case of the ailerons, the same two controlling conditions are utilized. In the case of the elevator, the two controlling conditions are the attitude of the aircraft, or in other words its angular position with respect to an axis passing through it laterally from side to side, and the tilting of the aircraft about the longitudinal axis previously referred to. Both of these conditions are measured by a single vertical gyroscope.

In the system disclosed in the Gille application, the directional gyroscope is required to move two control potentiometers, one for producing a controlling effect on a rudder driving motor and the other for producing a controlling effect on an aileron driving motor. Likewise, one of the axes of the vertical gyroscope in the Gille system is required to move three potentiometers, one potentiometer for each of the three motor control systems for the rudder, ailerons, and elevator. The operation of these potentiometers exerts a frictional torque on the gyroscope, which tends to upset their balance. It is desirable that the frictional load on the gyroscope be reduced as much as possible. In accordance with the principles described herein, I propose to reduce the frictional load on a gyroscope used in a control system of the type shown by Gille, by utilizing a single potentiometer unit for introducing a control effect into both the rudder and aileron control systems.

It is therefor an object of the present invention to provide an improved system for controlling the flight control surfaces of an aircraft of the type shown in the co-pending Gille application previously referred to.

A further object of this invention is to provide an improved electrical control system, wherein a plurality of variable conditions are used to simultaneously control a plurality of motors.

A further object is to provide, in a system of the type described, means whereby the operation of a single variable impedance may be utilized to introduce a control effect into each of a plurality of control systems. A still further object is to provide, in a system of the type described, a motor control system utilizing an electronic amplifier provided with an input transformer having a plurality of primary windings, and means responsive to a plurality of controlling conditions to individually vary the energization of the primary windings.

Other objects and advantages of the present invention will become apparent from a consideration of the accompanying specification, claims and drawing, in which the single figure represents, somewhat diagrammatically, an electrical system for operating the flight control surfaces of an aircraft, embodying the principles of my invention.

Referring to the drawing, there is shown a rudder control system including a pulley 10 over which passes a cable 11 which may be attached to the rudder (not shown). The pulley 10 is driven by a motor 12. The supply of electrical energy to the motor 12 is controlled by an amplifier 13 having a pair of input terminals 14 and 15 and power supply terminals 5 and 6. Power is supplied to the amplifier by a transformer 7 having a primary winding 8 connected to any suitable source of power (not shown) and a secondary winding 9 connected to terminals 5 and 6. Electrical control signals impressed on the input terminals of amplifier 13 are produced by a rudder control network 24, which includes an input transformer 16, having a secondary winding 17 and a pair of primary winding 20 and 21. The amplifier 13 may be of any suitable type capable of energizing motor 12 for rotation in opposite directions depending upon the phase of the signal voltage. Such a motor and amplifier are well known in the art and need not be described specifically herein. Typical motor and amplifier combinations of the type which may be employed are those shown in the patent to Anschutz-Kaempfe 1,586,233 and the patent to Whitman 1,952,587. A motor and amplifier combination which is particularly suitable for use in connection with the apparatus is one of the type described in the Gille application previously referred to, or the improved form disclosed and claimed in the joint application of Willis H. Gille, William J. Field, and Theodore J. Wilson, Serial No. 466,009, now Patent Number 2,425,734 patented August 19, 1947.

The rudder control network 24 also includes a rudder control potentiometer 25, a follow-up potentiometer 26, and an adjustment network generally indicated at 27.

The rudder control potentiometer 25 includes a slider 30 which is movable along a slide-wire resistance 31 by a directional gyroscope schematically indicated at 32. As long as the aircraft maintains a previously established course, the gyroscope 32 keeps the slider 30 in the center of resistance 31. If the aircraft deviates from its course, the gyroscope 32 moves the slider 30 to the left or right along resistance 31 in accordance with such deviation.

The follow-up potentiometer 26 includes a slider 33 which is movable along a slide-wire resistance 34. The slider 33 is fastened to the same shaft as the pulley 10. The terminals of primary winding 20 are connected to sliders 33 and 30 by conductors 22 and 23, respectively. A protective resistance 29 is connected in conductor 22, so that the primary winding 20 cannot be shunted by movement of both sliders 30 and 33 to the same ends of their respective slide-wires. If either of the primary windings should be substantially shunted, the impedance of the other primary winding would be lowered so that any signal impressed thereon would be considerably reduced in amplitude.

The terminals of resistance 31 are connected to the terminals 35 and 36 of the adjustment network 27. The terminals of resistance 34 are connected to terminals 37 and 38 of adjustment network 27. In the adjustment network 27 is the secondary winding 28, which supplies electrical energy to the rudder control network. The secondary winding is shown as a further winding of the transformer 7. The rudder control network 24 includes a form of Wheatstone bridge circuit. The construction and operation of this type of network is disclosed in detail in the Gille application previously mentioned, and will be described only briefly here.

The adjustment network 27 includes, in addition to the secondary winding 28, a centering adjustment 41. The centering adjustment includes two rheostats 42 and 43 connected in adjacent arms of the bridge circuit, and simultaneously operable in opposite senses by means of a manual controller 44. A pointer associated with the controller 44 moves over a calibrated scale adjacent the controller to indicate the setting of the centering adjustment. By operation of this controller, the position of the rudder for any given position of the control potentiometer 25 may be adjusted.

A variable resistance 45 is connected in parallel with resistance 31, and fixed resistances 46 and 47 are connected in the adjacent arms of the bridge circuit. As described in the Gille application, the variable resistance 45 operates as a ratio adjustment. In other words, its setting determines the distance through which the follow-up slider 33 must move in order to rebalance the bridge circuit after a given unbalancing movement of the control slider 30.

There is also shown in the drawing an aileron control system in which a pulley 50 drives a cable 51, which may be attached to the ailerons of the aircraft (not shown). The pulley 50 is driven by a motor 52 controlled by an amplifier 53 having input terminals 54 and 55. Input terminals 54 and 55 are connected to the secondary winding 56 of an input transformer 57 having primary windings 58 and 60. The transformer 57 is a part of an aileron control network 63, which also includes an aileron control potentiometer 64, a follow-up potentiometer 65, and an adjustment network 66. The primary winding 58 is connected by means of conductors 61 and 62 to the sliders of the potentiometers 64 and 65, respectively. A protective resistance 59 is connected in conductor 61, for the same purpose as resistance 29 in the rudder control system.

The adjustment network 66 is generally similar to the adjustment network 27 of the rudder control system. In order to facilitate an understanding of this adjustment network, the elements thereof have been given reference characters corresponding to the reference characters applied to the same elements in the adjustment network 27 but with the suffix A indicating that they are employed in connection with the aileron control system. Thus, the network is energized by the secondary winding 28A of a transformer 7A. The transformer 7A like transformer 7 has a secondary 9A connected to the power supply terminals 5A and 6A of amplifier 53. Interposed between the treminals of secondary 28A and the potentiometer 64 are two fixed resistors 46A and 47A. Interposed between the secondary 28A and the follow-up potentiometer 65 is a centering adjustment 41A and a ratio adjustment 45A. The centering adjustment 41A, as is the case with the centering adjustment 41, comprises two rheostats 42A and 43A simultaneously operable in opposite senses by means of a manual controller. This centering adjustment enables the position of the ailerons for any given position of the control potentiometer 64 to be adjusted. The ratio controller 45A is in the form of a variable resistance in parallel with the follow-up potentiometer 65. This varies the distance through which the follow-up slider 65 must move in order to rebalance the bridge circuit after a given unbalancing movement of the control potentiometer 64.

It will be noted from the above that the only substantial difference bteween the adjustment network 66 and the adjustment network 27 is that in the case of the one just described the centering and ratio adjustments are located on the follow-up potentiometer side of the secondary winding rather than on the control potentiometer side. It has been found desirable to employ the particular arrangement of the adjustment network in connection with the rudder control system because of the characteristic of the rudders of certain planes. Obviously, aside from the particular operating range desired, the arrangement of either adjustment network 27 or 66 can be employed.

The aileron control system 63 is generally similar electrically to the rudder control system as will be apparent from the foregoing description, and it is believed that a further description thereof is unnecessary.

The aileron control potentiometer 64 is operated by a vertical gyroscope 67, in accordance with the tilting of the aircraft about an axis passing through it longitudinally from nose to tail.

The resistance 31 in the rudder control network is provided with a center tap 70. A conductor 71 connects the center tap 70 with one terminal of the primary winding 60 on the input transformer 57 in the aileron control system. The other terminal of primary winding 60 is connected by means of a conductor 72 to the slider 30 of the rudder control potentiometer 25. A protective resistance 69 is connected in conductor 72 to prevent shunting 60 when slider 31 is at its center position.

The aileron control potentiometer 64 is provided with a center tap 73, which is connected through a conductor 74 to the lower terminal of primary winding 21 of input transformer 16 in the rudder control system. The upper terminal of primary winding 21 is connected through a conductor 75 to the slider of the aileron control potentiometer 64. A protective resistance 79 is connected in conductor 75 to prevent shunting of winding 21.

There is also shown in the drawing an elevator control system including a pulley 80 over which passes a cable 81 connected to the elevator surfaces (not shown). The pulley 80 is driven by a motor 82 controlled by an amplifier 83. The amplifier 83 is provided with a signal potential which is the resultant of two signal potentials produced in a compensating network 84 and a main elevator control network 85. The main elevator control network includes an adjustment network 90 corresponding to the adjustment network 66 of the aileron control system. Since the elements and their arrangement in the network is identical to that of the aileron control system, the various elements have been given the same reference characters with the exception that the suffix E has been employed instead of the suffix A, the suffix E indicating that the elements are concerned with the elevator control system. In view of the fact that the elements are identical, it is believed unnecessary in view of the similarity of the reference characters applied thereto to specifically refer to these elements herein. The signal potential provided by the main network 85 is determined by the relative positions of an elevator control potentiometer 87 operated by the vertical gyroscope in accordance with the angular position of the aircraft with respect to its lateral axis and an elevator follow-up potentiometer 88 which is operated concurrently with the pulley 80.

The compensating network 84 is energized by a secondary winding 91 constituting a further secondary winding of a transformer 7E which supplies power to the amplifier 83 and to the main network 85. Also associated with the compensating network is a control potentiometer 86 operated by the vertical gyroscope in accordance with the tilting of the aircraft about its longitudinal axis. This control potentiometer 86 comprises a resistance element 93 and a slider 94 which is operatively connected to the gyro. The two terminals of the resistance 93 are connected together and to the right hand terminal of secondary 91 by conductors 95, 96, and 97. The left hand terminal of transformer 91 is connected by conductors 98 and 99 to the center tap of the potentiometer resistance 93. A rheostat comprising a resistance 101 and slider 102 is connected by conductors 103, 104, and 99 between the center tap of resistor 93 and the slider 94. The slider 102 of this rheostat is connected by a conductor 105 to the left hand input terminal 107 of amplifier 83. The other input terminal 108 of amplifier 83 is connected by conductor 109 to the slider of the follow-up potentiometer 88.

Referring to the compensating network 84, it is to be noted that the secondary 91 is effectively connected between the center tap of resistor 93 and the two ends thereof. Furthermore, the resistance 101 of the rheostat consisting of resistor 101 and slider 102 is connected between the center tap of resistor 93 and the slider 94. Thus upon any deviation of slider 94 from the midpoint of resistor 93 by reason of a tilting of the aircraft, a potential is impressed across resistor 101. Since the two terminals of the resistor 93 are connected together, the phase of this potential will be the same regardless of which direction the slider 94 is moved. The position of the slider 102 will determine the amount of this voltage that is supplied to the amplifier. Thus, the rheostat consisting of resistor 101 and slider 102 functions as a trimmer rheostat to vary the effect of the compensating network in the control of the elevator.

The amplifiers 53 and 83 as well as the motors 52 and 82 are generally of the same type as amplifier 13 and motor 12.

Operation

When the various control and follow-up potentiometers are in the positions shown in the drawing, the aircraft is maintaining a straight course and the rudder and ailerons are in their normal positions. Under these conditions, let it be assumed that the aircraft deviates from its course, and that the directional gyroscope 32 responds to this deviation by moving the slider 30 to the right along resistance 31.

This motion of slider 30 unbalances the rudder control nework 24, and the unbalance potential existing between sliders 30 and 33 is transmitted through conductors 22 and 23, primary winding 20, and secondary winding 17 to amplifier 13. This signal impressed on amplifier 13 causes the motor 12 to operate in a direction to deflect the rudder so as to restore the aircraft to its previous course. At the same time, the slider 33 is moved to the right along resistance 34 to rebalance the control network 24.

Operation of slider 30 to the right along resistance 31 also produces a potential across primary winding 60 of input transformer 57 in the aileron control system. This potential is that existing between the slider 30 and the center tap 70 on resistance 31. This potential is transmitted through primary winding 60 and secondary winding 56 of transformer 57 causing the amplifier 53 to energize motor 52 so as to drive the ailerons to a position such that the aircraft makes a properly banked turn in returning to its previous course.

As the aircraft tilts about its longitudinal axis in response to the operation of the ailerons, the vertical gyroscope 67 moves the slider of control potentiometer 64.

If the transformer windings supplying the rudder and aileron control networks are in phase with each other, so that the right hand terminal of resistance 31 of the rudder control potentiometer 25 is positive at the same time that the right hand terminal of the resistance in the aileron control potentiometer 64 is positive, then the slider of the aileron control potentiometer is moved at this time to the right along its associated resistance.

This movement of the control potentiometer 64 introduces an unbalancing effect into the aileron control network 63 which causes a response of the motor 52 to drive the ailerons back toward their center position. At the same time, the movement of the aileron control potentiometer 64 introduces, through the primary winding 21, a signal into the amplifier 13 of the rudder control system. This signal causes a response of the motor 12 to restore the rudder toward its normal position.

As described in the Gille application, these restoring movements of the rudder and ailerons are made because it has been found that a smaller deflection of the rudder and ailerons is necessary to maintain an aircraft in a properly banked turn than is required to bank and turn the aircraft from a straight level course.

From the foregoing discussion, it should be apparent that the rudder control potentiometer 25 produces a control effect on both the rudder and ailerons, and that the aileron control potentiometer 64 likewise produces a control effect on both the rudder and ailerons.

Referring again to the condition which takes place when the plane is banked in connection with a turn, the vertical gyro is effective not only to move the potentiometer 64 but also to move the potentiometer 86. The result of this is that a voltage occurs between slider 102 and the slider of potentiometer 87, this voltage being dependent upon the amount of movement of the arm 94 of potentiometer 86 and the adjustment of slider 102. The bridge is so designed that this voltage is of a phase to cause the elevator control system to be unbalanced in such a direction as to raise the elevators to cause upward movement of the plane. In other words, upon the banking occurring, a signal is introduced into the system such as to cause the plane to tend to rise slightly. The reason for this, as explained in the aforementioned Gille application, is to compensate for the tendency of a plane to lose altitude when placed into a bank. By adjusting the elevators in the manner recited, this tendency is overcome so that the plane maintains its altitude during the turn. As soon as the banking condition is terminated, the elevators are returned to their normal position.

It is to be understood that the action which has been described in connection with the ailerons upon the plane being placed into a bank during a turn is that which occurs whenever the plane is tilted for any reason. Thus, upon the plane being tilted, the ailerons and elevators are both deflected to cause the plane to be tilted back to its normal position and to temporarily cause the elevators to exert a climbing tendency on the plane to counteract the tendency to lose altitude due to the banking condition.

In the event of a plane tilting about a transverse axis, the potentiometer 87 is deflected in one way or the other. If the plane tilts downwardly, the signal introduced into amplifier 83 is of such phase as to cause the elevators to be raised to tend to cause the plane to climb. As the plane tends to level off, the elevators will be returned to their normal position.

While I have shown and described a preferred embodiment of my invention, other modifications will occur to those skilled in the art and I therefore wish my invention to be limited only by the appended claims.

I claim as my invention:

1. Electrical control apparatus, comprising in combination, a plurality of load devices to be positioned, electrical motor means for driving each of said load devices, a balanceable electrical network including a control impedance and a rebalancing impedance, means for varying said control impedance to unbalance said network, means responsive to unbalance of said network for controlling one of said motor means, means driven by said one motor means for varying said rebalancing impedance to rebalance said network, means including an electronic amplifier for controlling a second of said motor means, an input transformer associated with said amplifier having two primary windings, means including said control impedance for varying the energization of one of said primary windings, and rebalancing means operated by said second motor means to vary the energization of the second of said primary windings.

2. Electrical control apparatus, comprising in combination, a pair of load devices to be positioned, electrical motor means for driving each of said load devices, and control means for said motor means comprising, for each motor means, a balanceable electrical network including a control impedance and a rebalancing impedance, means responsive to one of a pair of conditions indicative of the need for operation of said load devices for varying said control impedance to unbalance said network, an electronic amplifier for controlling said motor means, an input transformer for said amplifier having a pair of primary windings, means connecting one of said windings to said network for energization in accordance with the unbalance of said network, means connecting the second of said windings to the control impedance in the other of said networks for energization in accordance with the other of said conditions, and means associated with each motor means and driven by said motor means for varying the rebalancing impedance of the network associated with said motor means.

3. An electrical control apparatus which includes: a first motor means connected to and adapted to position a first load means; a second motor means connected to and adapted to position a second load means; a first rebalanceable electrical network having a main control impedance therein; a second rebalanceable electrical network having a main control impedance therein; a first control means connected to said first motor means and adapted to control the operation thereof; a second control means connected to said second motor means and adapted to control the operation thereof; a first transformer having a secondary winding connected to said first control means, and a pair of primary windings; a second transformer having a secondary winding connected to said second control means, and a pair of primary windings; means connecting said first network to one primary of said first transformer, and connecting said main control impedance of said second network to the other primary of said first transformer; and means connecting said second network to one primary of said second transformer, and connecting said main control impedance of said first network to the other primary of said second transformer.

4. An electrical control apparatus which includes: first and second load devices to be positioned; first and second motor means operable to position said first and second load devices, respectively; first and second electronic amplifier means controlling the operation of said first and second motor means respectively; a first rebalanceable electrical network having a main control impedance, and a rebalancing impedance operated by said first motor means; a second rebalanceable electrical network having a main control impedance, and a rebalancing impedance operated by said second motor means; a first transformer having a secondary connected to the input terminals of said first electronic amplifier for controlling the operation thereof, and having a first primary winding connected to the entirety of said first network, and a second primary winding connected to said main control impedance of said second network; and a second transformer having a secondary connected to the input terminals of said second electronic amplifier for controlling the operation thereof, and having a first primary winding connected to the entirety of said second network, and a second primary winding connected to said main control impedance of said first network.

5. An electrical control apparatus which includes first and second motors to be operated; first and second control means connected to said first and second motors respectively, for operation thereof; a plurality of adjustable control networks each having a plurality of pairs of output connections the polarity across each pair of connections in any half cycle depending on the adjustment of said networks; a first transformer having a secondary winding connected to said first control means, a first primary winding connected across a pair of output connections of one network, and a second primary winding connected across a pair of output connections of a second network; a second transformer having a secondary winding connected to said second control means, a first primary winding connected across another pair of connections of said first network, and a second primary connected across another pair of connections of the second network.

DAVID L. MARKUSEN.

REFERENCES CITED

The following references are of record in the file of this patent:

UNITED STATES PATENTS

| Number | Name | Date |
|---|---|---|
| 1,832,334 | Tarbox | Nov. 17, 1931 |
| 2,066,194 | Bates | Dec. 29, 1936 |
| 2,134,901 | Wey | Nov. 1, 1938 |
| 2,164,728 | Wey | July 4, 1939 |
| 2,232,077 | Rosecky | Feb. 18, 1941 |
| 2,234,326 | Tiebel | Mar. 11, 1941 |

FOREIGN PATENTS

| Number | Country | Date |
|---|---|---|
| 504,591 | Germany | Aug. 6, 1930 |